(12) United States Patent
Jeong et al.

(10) Patent No.: US 9,319,701 B2
(45) Date of Patent: Apr. 19, 2016

(54) APPARATUS AND METHOD FOR ALLOCATING A DATA RATE IN A MULTI-ANTENNA TRANSMITTER

(75) Inventors: Hong-Sil Jeong, Seoul (KR); Hyo-Jin Lee, Suwon-si (KR); Seho Myung, Suwon-si (KR); Jae-Yoel Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 858 days.

(21) Appl. No.: 13/096,494

(22) Filed: Apr. 28, 2011

(65) Prior Publication Data
US 2011/0268176 A1 Nov. 3, 2011

(30) Foreign Application Priority Data
Apr. 28, 2010 (KR) .................. 10-2010-0039734

(51) Int. Cl.
*H04N 19/36* (2014.01)
*H04N 19/34* (2014.01)
*H04N 19/37* (2014.01)
(Continued)

(52) U.S. Cl.
CPC .............. *H04N 19/36* (2014.11); *H04L 1/0001* (2013.01); *H04L 1/0003* (2013.01); *H04L 1/0009* (2013.01); *H04L 1/0021* (2013.01); *H04L 1/0668* (2013.01); *H04L 27/34* (2013.01); *H04N 19/30* (2014.11); *H04N 19/34* (2014.11); *H04N 19/37* (2014.11); *H04N 21/2383* (2013.01); *H04N 21/2385* (2013.01); *H04N 21/234327* (2013.01); *H04N 21/631* (2013.01); *H04N 21/8451* (2013.01); *H04L 1/06* (2013.01)

(58) Field of Classification Search
CPC .................. H04N 19/00424; H04N 19/00442; H04N 19/00448; H04N 19/00454; H04N 19/36; H04N 19/30; H04N 19/34; H04N 19/37
USPC ...................................................... 375/240.11
See application file for complete search history.

(56) References Cited

U.S. PATENT DOCUMENTS

2004/0196901 A1* 10/2004 Demos ..................... H04N 5/14
375/240
2004/0228535 A1* 11/2004 Honda ................... H04N 19/30
382/233

(Continued)

FOREIGN PATENT DOCUMENTS

| KR | 1020090016247 | 2/2009 |
| KR | 1020090076589 | 7/2009 |

(Continued)

OTHER PUBLICATIONS

X. Liu, "Rate-constrained Conditional Replenishment Video Coding with Adaptive Change Detection", Stanford University (Dec. 1, 2000).*

(Continued)

*Primary Examiner* — David N Werner
(74) *Attorney, Agent, or Firm* — The Farrell Law Firm, P.C.

(57) ABSTRACT

An apparatus and method for allocating a data rate in a multi-antenna system are provided, wherein a noise threshold corresponding to a modulation scheme, a coding rate, or a combination of both applied to a base layer from among a plurality of layers is set as a reference noise threshold, and a data rate is allocated to an enhanced layer among the plurality of layers, based on the reference noise threshold and a use or non-use of hierarchical transmission.

19 Claims, 2 Drawing Sheets

(51) Int. Cl.
  *H04N 19/30*   (2014.01)
  *H04N 21/63*   (2011.01)
  *H04N 21/2383*   (2011.01)
  *H04N 21/845*   (2011.01)
  *H04L 27/34*   (2006.01)
  *H04N 21/2385*   (2011.01)
  *H04L 1/00*   (2006.01)
  *H04N 21/2343*   (2011.01)
  *H04L 1/06*   (2006.01)

(56) References Cited

U.S. PATENT DOCUMENTS

2007/0230811 A1* 10/2007 Lee ................. H04N 19/70
  382/244
2010/0262712 A1* 10/2010 Kim ............... H04N 21/234327
  709/231

FOREIGN PATENT DOCUMENTS

KR   1020090113505   11/2009
KR   1020100034167   4/2010

OTHER PUBLICATIONS

Machine translation of KR 10-2009-0113505 A.*
Machine translation of KR 10-2009-0076589 A.*
Machine Translation of KR 10-2009-0076589 (annotated).*
Machine Translation of KR 10-2009-0113505 (annotated).*
M. Wien, H. Schwarz, & T. Oelbaum, "Performance Analysis of SVC", 17 IEEE Trans. on Circuits & Sys. For Video Tech. 1194-1203 (Sep. 2007).*
H. Schwarz, D. Marpe, & T. Wiegand, "Overview of the Scalable Video Coding Extension of the H.264/AVC Standard", 17 IEEE Trans. on Circuits & Sys. for Video Tech. 1103-1120 (Sep. 2007).*
S. Wenger, Y.K. Wang, & M.M. Hannuksela, "RTP payload format for H.264/SVS scalable video coding", 7 J. Zhejiang U. Sci. A 657-667 (May 2006).*
ITU-T Recommendation H.264 (Mar. 2009).*

* cited by examiner

APPARATUS AND METHOD FOR ALLOCATING A DATA RATE IN A MULTI-ANTENNA TRANSMITTER

PRIORITY

This application claims priority under 35 U.S.C. §119(a) to a Korean Patent Application filed in the Korean Intellectual Property Office on Apr. 28, 2010 and assigned Serial No. 10-2010-0039734, the content of which is incorporated herein by reference.

BACKGROUND OF THE INVENTION

1. Field of the Invention

The present invention relates generally to an apparatus and method for allocating a data rate in a transmitter having a plurality of antennas, and more particularly, to an apparatus and method for allocating a data rate on a layer-by-layer basis in a multi-antenna transmitter.

2. Description of the Related Art

There are many techniques for encoding and transmitting a Television (TV) broadcast video to different terminals via an Internet Protocol (IP) network. Among the different techniques, a hierarchical transmission scheme, commonly referred to as Scalable Video Coding (SVC), is more efficient in terms of channel capacity than a currently popular Advanced Video Coding (AVC) scheme. However, because SVC has an increased overhead of about 10 to 30% compared to AVC, SVC requires a higher bit rate than AVC to ensure the same video quality.

Compared to using a single antenna, using multiple antennas increases channel capacity and information throughput in a wireless mobile communication environment. To maximize the benefit of using multiple antennas, various techniques related to spatial multiplexing and space-time coding have been developed and their efficiency has been verified by information theory.

A system supporting multiple antennas (hereinafter, referred to as "a multi-antenna system") is considered a promising technology for broadcast services requiring high data rates. To prepare for a multi-antenna system being used for a portable broadcasting standard as a broadcast service, e.g., Digital Video Broadcast-Next Generation Handheld (DVB-NGH), efforts have been expended toward improvement of system performance by concatenating Low Density Parity Check (LDPC) codes to a multi-antenna system.

Therefore, a need exists for a method for allocating an optimum data rate depending on whether the SVC scheme is applied to a multi-antenna system using an LDPC for DVB-NGH.

SUMMARY OF THE INVENTION

Accordingly, the present invention is designed to address at least the problems and/or disadvantages described above and to provide at least the advantages described below. An aspect of the present invention is to provide an apparatus and method for differentially allocating a data rate to each layer at a transmitter in a multi-antenna system using a plurality of layers.

Another aspect of the present invention is to provide an apparatus and method for differentially allocating a data rate to each layer, based on use or non-use of SVC at a transmitter in a multi-antenna system using a plurality of layers.

Another aspect of the present invention is to provide an apparatus and method for selectively allocating a coding rate, a modulation scheme, or a combination of both to each layer at a transmitter in a multi-antenna system using a plurality of layers.

Another aspect of the present invention is to provide an apparatus and method for independently using a coding rate, a modulation scheme, or a combination of both for each layer in order to optimize data rates at a transmitter in a multi-antenna system using a plurality of layers.

Another aspect of the present invention is to provide an apparatus and method for allocating a coding rate, a modulation scheme, or a combination of both, which ensure excellent performance and satisfy a maximum data rate at a transmitter in a multi-antenna system using a plurality of layers.

Another aspect of the present invention is to provide an apparatus and method for using a noise threshold for a data rate of a base layer as a reference noise threshold for allocating a data rate to an enhanced layer at a transmitter in a multi-antenna system using a plurality of layers.

Another aspect of the present invention is to provide an apparatus and method for allocating a data rate to an enhanced layer using a noise threshold for a data rate of a base layer, according to whether or not SVC is used at a transmitter in a multi-antenna system using a plurality of layers.

Another aspect of the present invention is to provide an apparatus and method for allocating a coding rate, a modulation scheme, or a combination of both to an enhanced layer using a noise threshold for a coding rate, a modulation scheme, or a combination of both allocated to a base layer, according to whether or not SVC is used at a transmitter in a multi-antenna system using a plurality of layers.

In accordance with an aspect of the present invention, a method is provided for allocating a data rate at a transmitter having a plurality of antennas, wherein a noise threshold corresponding to data transmission at a data rate applied to a base layer from among a plurality of layers is set as a reference noise threshold, and a data rate is allocated to an one or more other layers from among the plurality of layers, based on the reference noise threshold.

In accordance with another aspect of the present invention, an apparatus is provided for allocating a data rate at a transmitter having a plurality of antennas, The apparatus includes a data rate allocator that selects, as a reference noise threshold, a noise threshold corresponding to data transmission at a base-layer data rate applied to a base layer from among a plurality of layers, and determines data rate to be allocated to one or more other layers from among the plurality of layers, based on the reference noise threshold and, and a transmission module that transmits base-layer data for the base layer at the base-layer data rate and transmits other-layer data for the other-layer at the other-layer data rate.

In accordance with another aspect of the present invention, a non-transitory computer-readable medium for use in allocating a data rate at a transmitter including a plurality of antennas, the non-transitory computer-readable medium recording a program allowing a computer to execute a method. The method includes setting, as a reference noise threshold, a noise threshold corresponding to data transmission at a data rate applied to a base layer from among a plurality of layers; and allocating a data rate to one or more other layers from among the plurality of layers, based on the reference noise threshold.

In accordance with another aspect of the present invention, a transmitter having a plurality of antennas is provided, in which a base layer transmitter transmits base-layer data at a data rate applied to a base layer among a plurality of layers through one of the plurality of antennas, and other layer transmitter transmits other-layer data at a data rate applied to other layer through at least one of another one of the plurality of antennas, based on a reference noise threshold corresponding to transmission of the base-layer data at the data rate applied to the base layer.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Figure 1:
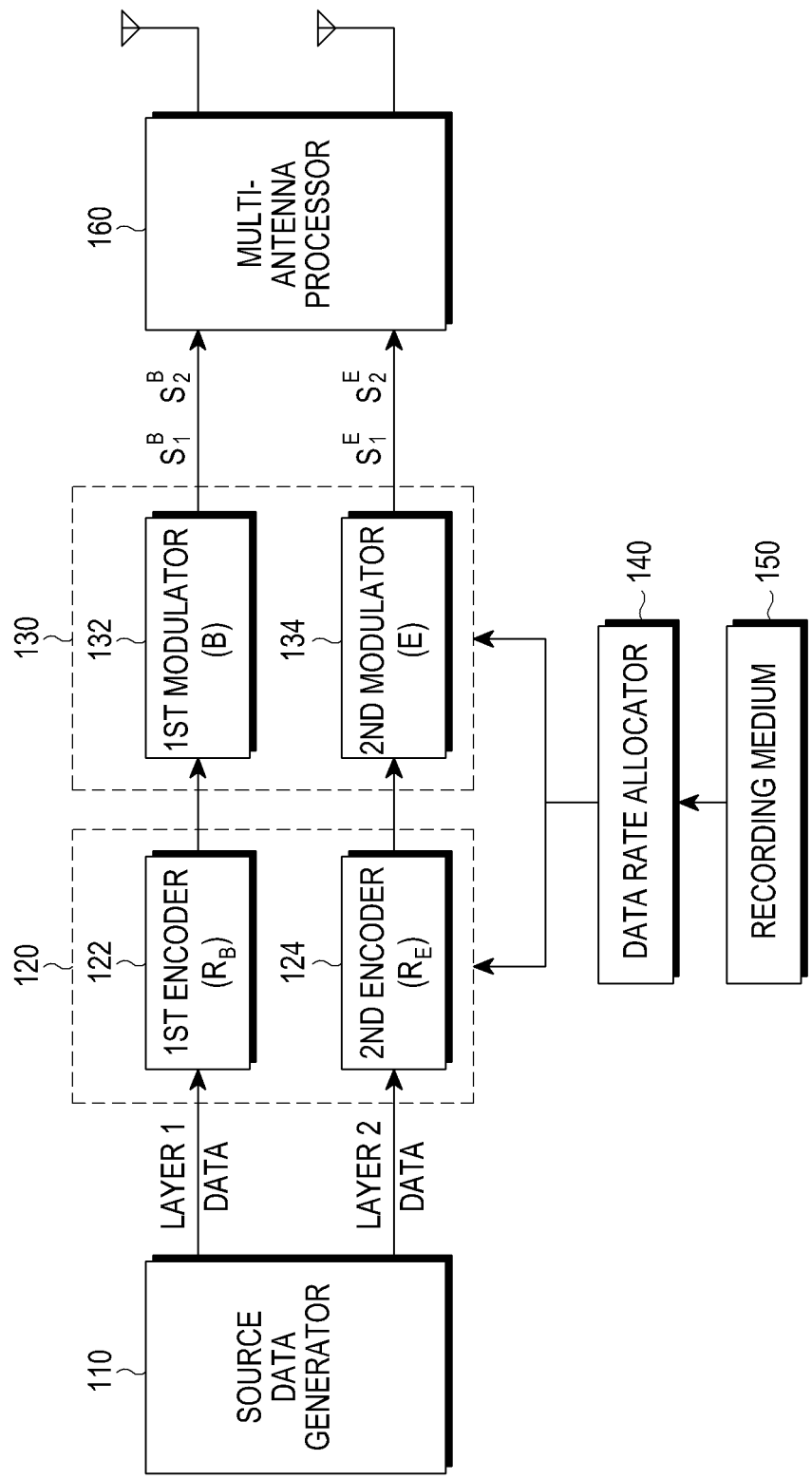
FIG. 1 is a block diagram illustrating a transmitter in a multi-antenna system according to an embodiment of the present invention.

Various embodiments of the present invention will be described in greater detail below with reference to the accompanying drawings. In the following description, like drawing reference numerals are used for the like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail to avoid obscuring the invention with unnecessary detail.

Specifically, the terms described below are defined in connection with the function of the present invention. The meaning of the terms may vary according to the user, the intention of the operator, usual practice, etc. Therefore, the terms should be defined based on the description rather than the specification.

In a multi-antenna system with a plurality of layers using SVC, when a receiver receives data corresponding to a base layer (hereinafter, referred to as "base-layer data") in a channel environment with a low Signal-to-Noise Ratio (SNR), i.e., in a poor channel environment, it is not always necessary for the receiver to receive data corresponding to an enhanced layer (hereinafter, referred to as "enhanced-layer data"). However, if SVC is not used, the receiver should be able to receive both the base-layer data and the enhanced-layer data, despite the low SNR.

Accordingly, a different data rate allocation method should be used depending on whether or not SVC is used. Specifically, when using SVC, a lower data rate is allocated to at least one enhanced layer, compared to a data rate allocated to the base layer. However, if SVC is not used, a higher data rate is allocated to the at least one enhanced layer, compared to a data rate allocated to the base layer. Data rate allocation may be equivalent to allocation of a coding rate, a modulation scheme, or a combination of both. For example, given a modulation scheme, a data rate is allocated by adjusting a coding rate. Given a coding rate, a data rate is allocated by adjusting a modulation scheme. It is also possible to allocate a data rate by adjusting both a coding rate and a modulation scheme.

In accordance with an embodiment of the present invention, a method is provided for allocating a data rate to each layer by differentially selecting a coding rate, a modulation scheme, or a combination of a coding rate and a modulation scheme to each layer, depending on whether or not SVC is used, at a transmitter in a multi-antenna system using a plurality of layers.

When data is transmitted using SVC, data rates are allocated to layers such that base-layer data can be received even in a low-SNR channel environment. In this case, reception of enhanced-layer data is not a necessity. Therefore, a lower data rate may be allocated to an enhanced layer, relative to a data rate allocated to a base layer.

However, when SVC is not used, enhanced-layer data should be received. Thus, data rates are allocated such that enhanced-layer data and base-layer data can be received, even in a low-SNR channel environment. Data reception or non-reception means that a receiver can or cannot decode received data.

For this purpose, a noise threshold is determined for at least one enhanced layer, using a noise threshold for a data rate of the base layer as a reference noise threshold and a data rate matching the determined noise threshold is allocated to the at least one enhanced layer. Use or non-use of hierarchical transmission, for instance, use or non-use of SVC, is taken into account in determining a noise threshold for the at least one enhanced layer. Specifically, when SVC is used, a noise threshold higher than the reference noise threshold is set as a target noise threshold for each enhanced layer. However, when SVC is not used, the target noise threshold for each enhanced layer is lower than the reference noise threshold.

Because a noise threshold higher than the reference noise threshold is applied to the enhanced layer when using SVC, the enhanced layer is allocated a lower data rate than that of the base layer. However, a noise threshold lower than the reference noise threshold is applied to the enhanced layer when not using SVC, and the enhanced layer is allocated a higher data rate than that of the base layer.

When SVC is not used, a noise threshold lower than the reference noise threshold is selected as a target noise threshold for the enhanced layer. For example, the highest of noise thresholds, which are lower than the reference noise threshold, may be selected as the target noise threshold for the enhanced layer. When using SVC, however, a noise threshold higher than the reference noise threshold is selected as a target noise threshold for the enhanced layer. For example, the lowest of noise thresholds, which are higher than the reference noise threshold, may be selected as the target noise threshold for the enhanced layer.

As described above, data rate allocation may be carried out by controlling a coding rate, a modulation scheme, or a combination of both. Accordingly, it is to be clearly understood that data rate allocation covers allocation of a coding rate, a modulation scheme, or a combination of both. Data rate allocation based on a coding rate is based on an assumption that a modulation scheme is given to the base layer and the enhanced layer. Data rate allocation based on a modulation scheme is based on an assumption that a coding rate is given to the base layer and the enhanced layer.

FIG. 1 is a block diagram illustrating a transmitter in a multi-antenna system according to an embodiment of the present invention. In FIG. 1, the transmitter is illustrated with two antennas and thus two layers, namely a base layer (Layer 1) and an enhanced layer (Layer 2) by way of example. However, it is obvious to those skilled in the art that the present invention is also applicable to a transmitter with additional antennas and layers. When more antennas are used, the overall data rate available to the transmitter increases in proportion to the increased number of antennas.

Horizontal transmission is a premise for the transmitter. That is, the transmitter includes an encoder for each antenna. However, it is to be clearly understood that embodiments of the present invention can be applied to a transmitter supporting perpendicular transmission, i.e., a transmitter in which a plurality of antennas share a single encoder. Additionally, a modulator may be provided for each layer or may be shared among a plurality of layers.

Referring to FIG. 1, the transmitter includes a source data generator 110, an encoder unit 120, a data rate allocator 140, a recording medium 150, and a multi-antenna processor 160.

The source data generator 110 generates data in conformance with a supported communication standard such as DVB-NGH. In view of the assumption of one base layer and one enhanced layer as illustrated in FIG. 1, the source data generator 110 generates base-layer data for the base layer and enhanced-layer data for the enhanced layer.

The data rate allocator 140 allocates a data rate for transmitting the base-layer data (a base-layer data rate) and a data rate for transmitting the enhanced-layer data (an enhanced-layer data rate). Specifically, the data rate allocator 140 uses a noise threshold acquired or predicted from the base-layer data rate (hereinafter, referred to as a "reference noise threshold") and a use or non-use of SVC in allocating the enhanced-layer data rate. More specifically, the data rate allocator 140 calculates a noise threshold with respect to each data rate for each layer and stores the noise threshold for each data rate of each layer in the recording medium 150. The data rate allocator 140 selects a noise threshold predicted from transmission of the base data rate at the base-layer data rate as the reference noise threshold. The data rate allocator 140 then determines whether or not SVC is used and allocates the enhanced-layer data rate, based on the reference noise threshold according to the determination result. Herein, the data rate allocator 140 allocates the enhanced-layer data rate under different conditions depending on whether or not SVC is used.

For example, if SVC is not used, a data rate is selected for the enhanced layer, which ensures decoding of the enhanced-layer data at a receiver. If SVC is used, a data rate is selected for the enhanced layer, which does not necessarily ensure decoding of the enhanced-layer data at the receiver.

That is, if SVC is not used, a lower noise threshold than the reference noise threshold is selected as a target noise threshold from among noise thresholds that the enhanced layer can achieve. If SVC is used, a higher noise threshold than the reference noise threshold is selected as the target noise threshold from among the noise thresholds that the enhanced layer can achieve.

Preferably, when SVC is not used, the highest of noise thresholds, which are lower than the reference noise threshold, is selected as the target noise threshold from among the noise thresholds that the enhanced layer can achieve. If SVC is used, the lowest of noise thresholds, which are higher than the reference noise threshold, is selected as the target noise threshold from among the noise thresholds that the enhanced layer can achieve.

After the target noise threshold is selected for the enhanced layer, the data rate allocator 140 determines a data rate satisfying the selected target noise threshold. The determined data rate is the enhanced-layer data rate.

To select the target noise threshold and determine the enhanced-layer data rate based on the target noise threshold, the data rate allocator 140 may use the already-calculated noise thresholds for respective data rates. In this case, the data rate allocator 140 reads data indicating noise thresholds for respective data rates of the enhanced layer from the recording medium 150. For example, if a target noise threshold is selected, a modulation scheme and a coding rate are determined according to the selected target noise threshold. Determination of a modulation scheme and a coding rate may be equivalent to determination of a data rate.

The data rate allocator 140 allocates a combination of a coding rate and a modulation scheme to transmit the enhanced-layer data at the determined enhanced-layer data rate. That is, to achieve the determined data rate, both a modulation scheme and a coding rate may be considered simultaneously, only a coding rate may be considered for a given modulation scheme, or only a modulation scheme may be considered for a given coding rate.

The data rate allocator 140 provides information about the coding rates and the modulation schemes matching the allocated data rates to a base layer transmitter and an enhanced layer transmitter. The base layer transmitter includes a first encoder 122 and a first modulator 132 for transmitting the base-layer data, and the enhanced layer transmitter includes a second encoder 124 and a second modulator 134 for transmitting the enhanced-layer data.

The encoder unit 120 includes the first encoder 122 for encoding the base-layer data received from the source data generator 110 at a specific coding rate and the second encoder 124 for encoding the enhanced-layer data received from the source data generator 110 at a specific coding rate. Various coding schemes are available to the encoder unit 120. For example, a Low Density Parity Check (LDPC) coding scheme supporting various coding rates is available to the encoder unit 120.

The first encoder 122 encodes the base-layer data at the coding rate allocated for transmission of the base-layer data. The second encoder 124 encodes the enhanced-layer data at the coding rate allocated for transmission of the enhanced-layer data.

As described above, the coding rate used in the second encoder 124 is allocated by the data rate allocator 140.

The modulator unit 130 includes the first modulator 132 for modulating the coded base-layer data received from the encoder unit 120 in a specific modulation scheme and the second modulator 134 for modulating the coded enhanced-layer data received from the encoder unit 120 in a specific modulation scheme. The modulator unit 130 may use 4-ary Quadrature Amplitude Modulation (4QAM), 16QAM, 64QAM, 128QAM, etc.

The first modulator 132 modulates the coded base-layer data in the modulation scheme allocated for transmission of the base-layer data. The second modulator 134 modulates the coded enhanced-layer data in the modulation scheme allocated for transmission of the enhanced-layer data.

As described above, the modulation scheme used in the second modulator 134 is allocated by the data rate allocator 140.

In view of the assumption of horizontal transmission, the modulated signal $X_i$ output from the modulator unit 130 in the transmitter of FIG. 1 may be represented as $$\begin{bmatrix} S_i^B \\ S_i^E \end{bmatrix}.$$

The multi-antenna processor 160 transmits the modulated base-layer data and enhanced-layer data received from the modulator unit 130 through antennas allocated to the base layer and the enhanced layer.

Figure 2:
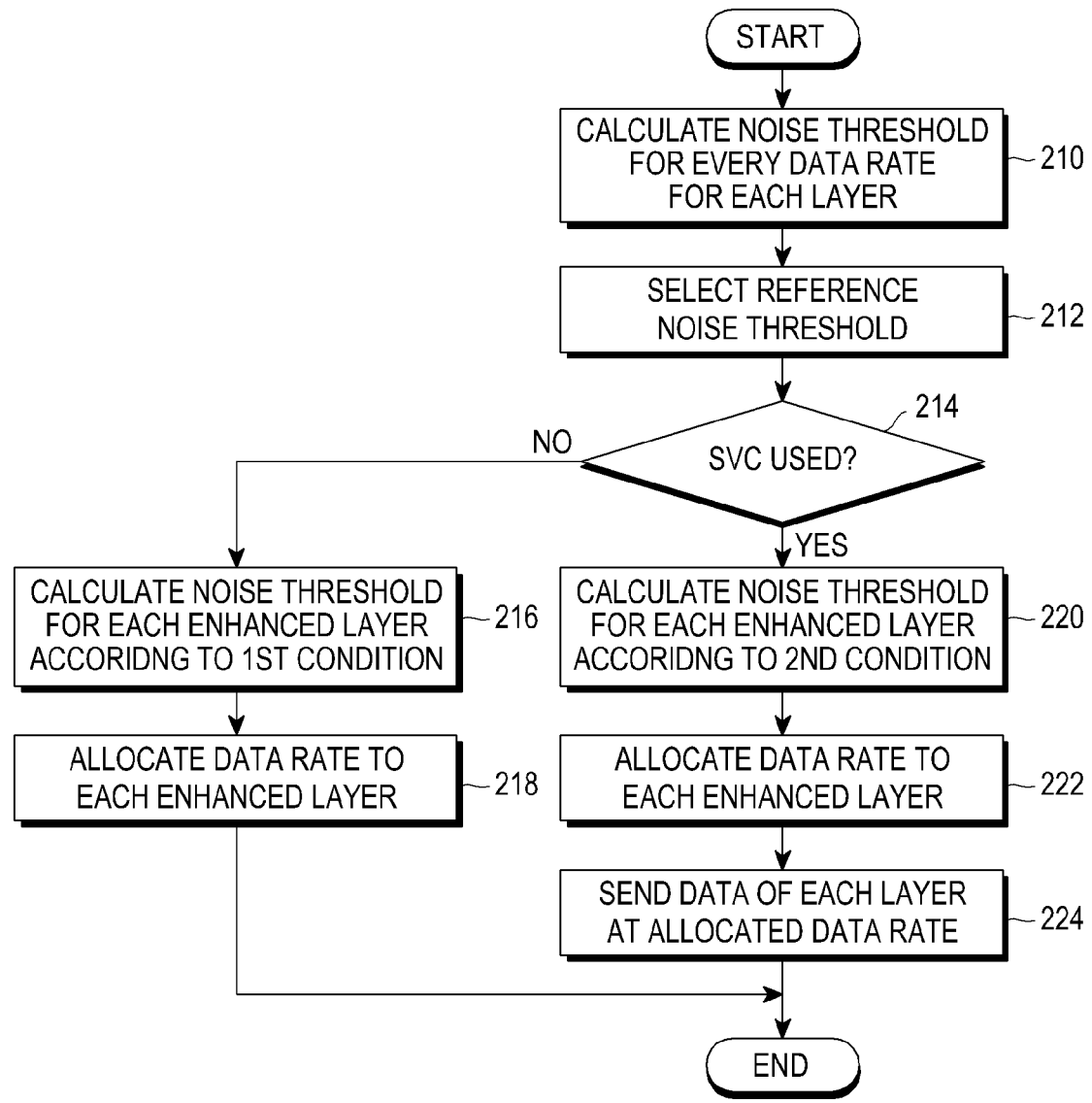
FIG. 2 is a flowchart illustrating a control operation for allocating a data rate at the transmitter in a multi-antenna system using a plurality of layers according to an embodiment of the present invention.

FIG. 2 is a flowchart illustrating a control operation for allocating a data rate at a transmitter in a multi-antenna system using a plurality of layers according to an embodiment of the present invention. In FIG. 2, a target noise threshold is determined for at least one enhanced layer, using a reference noise threshold for a base layer, and a data rate required to achieve the determined target noise threshold is allocated to the at least one enhanced layer. When the target noise threshold is determined for the at least one enhanced layer, the use or non-use of SVC is taken into consideration.

When SVC is not used, neither a base layer nor an enhanced layer technically exists. However, for convenience of the description, two layers transmitted through two transmission antennas are still respectively referred to as a base layer and an enhanced layer.

Referring to FIG. 2, the transmitter calculates a noise threshold for every data rate available to each layer in step 210. Noise thresholds are calculated for a base layer and at least one enhanced layer. For example, a noise threshold is the condition for error-free data reception, i.e., a minimum SNR that enables error-free decoding of data transmitted at a given data rate may be calculated as a noise threshold.

A data rate may be determined for each layer by a coding rate, a modulation scheme, or a combination of both. For instance, if a data rate is determined by a combination of a coding rate and a modulation scheme, the data rate may be allocated using a Modulation and Coding Scheme (MCS) level. Although different MCS levels are used, the same data rate may be allocated. That is, even though different MCS levels specify different coding rates and modulation schemes, the transmitter may eventually transmit data at the same data rate. However, the following description is given with the appreciation that different MCS levels lead to different data rates.

A noise threshold may be calculated for each data rate in a different manner depending on a transmission scheme used in the multi-antenna system. Depending on whether the multi-antenna system uses an Alamouti space-time code and Minimum-Mean-Square Error (MMSE) scheme or an MMSE-Successive Interference Cancellation (SIC)-based Bell Laboratories Space-Time (BLAST) scheme, a different noise threshold calculation method may be used.

When the Alamouti space-time code is used, a noise threshold may be computed using Equation (1). That is, a noise threshold can be determined from $\sigma^2$, which results in a particular channel capacity using the inverse function of a function representing the average of channel capacity calculated using Equation (1). The noise threshold may be represented as the channel variance, $\sigma^2$ or an SNR in dB obtained by converting $\sigma^2$ to $10^{1/(10\sigma^2)}$.

$$C^{Alamouti} = E_\alpha [C_\alpha^{Alamouti}]. \quad (1)$$

Equation (1) computes the average of the conditional channel capacity of Bit-Interleaved Coded Modulation (BICM), $C_\alpha^{Alamouti}$ for a channel coefficient $\alpha(\|H\|_F^2)$ of a multi-antenna system using the Alamouti space-time code.

$C_\alpha^{Alamouti}$ is defined by Equation (2).

$$C_\alpha^{Alamouti} = 2m - \frac{1}{2} \sum_{i=1}^{2} E_{s_i, r_i} \left[ \log_2 \frac{\sum_{s_i \in S} p(r_i | s_i, \alpha)}{p(r_i | s_i, \alpha)} \right] \quad (2)$$

In Equation (2), r is the product of a reception vector and a channel matrix, s is a signal constellation corresponding to a particular modulation scheme, and a probability density function $p(r_i|s_i,\alpha)$ is defined by Equation (3).

$$p(r_i | s_i, \alpha) = \frac{1}{\pi\sigma^2} \exp\left(-\frac{\alpha|r_i - s_i|^2}{\sigma^2}\right) \quad (3)$$

In Equation (3), $\sigma^2$ is the variance of a Gaussian distribution and exp(x) represents $e^x$.

When an MMSE-SIC detector is used, a noise threshold may be computed using Equation (4).

$$C^{MMSE-SIC} = E_{\alpha_1, \alpha_2, \ldots, \alpha_{N_t}} \left[ \sum_{i=1}^{N_t} C_{\alpha_i}^{MMSE-SIC,(i)} \right] \quad (4)$$

According to Equation (4), an achievable average data rate can be calculated by averaging a conditional data rate, which is computed by summing the conditional channel capacities $C_{\alpha_i}^{MMSE-SIC,(i)}$ of $i^{th}$ layers ($0 < i \leq N_t$) in a multi-antenna system using spatial multiplexing, with respect to the channel coefficients of the layers, $\alpha_1, \alpha_2, \ldots, \alpha_{N_t}$. $\sigma_2$ that produces a particular channel capacity is computed using the function of averaging channel capacity in Equation (4) or the inverse function of the function of computing a data rate for each layer and the noise threshold can be determined using $\sigma^2$. The noise threshold may be represented as the channel variance, $\sigma^2$ or an SNR in dB obtained by converting $\sigma^2$ to $10^{1/(10\sigma^2)}$.

When an $i^{th}$ transmission antenna transmits a symbol $x_i$ of a signal constellation s corresponding to a particular modulation scheme, the conditional channel capacity of BICM, $C_{\alpha_i}^{MMSE-SIC,(i)}$ for $\alpha$ of an $i^{th}$ layer may be defined by Equation (5).

$$C_{\alpha_i}^{MMSE-SIC,(i)} = 2m - E_{s_i, r_i} \left[ \log_2 \frac{\sum_{s_i \in S} p(r_i | s_i, \alpha_i)}{p(r_i | s_i, \alpha_i)} \right] \quad (5)$$

In Equation (5), r is the product of a reception vector and a channel matrix, s is a signal constellation corresponding to a particular modulation scheme, and a probability density function $p(r_i|s_i,\alpha_i)$ is defined by Equation (6).

$$p(r_i | s_i, \alpha) = \frac{1}{\pi\sigma_i^2} \exp\left(-\frac{|r_i - \alpha_i s_i|^2}{\sigma_i^2}\right) \quad (6)$$

In Equation (6), $\sigma^2$ is the variance of a Gaussian distribution and exp(x) represents $e^x$.

As described above, noise thresholds are calculated for each layer and a capacity graph is drawn using the noise thresholds. Thereafter, an SNR matching a target data rate may be acquired from the capacity graph.

Table 1 below illustrates examples of noise thresholds for each layer, calculated for every coding rate with different modulation schemes, on the conditions of an MMSE-SIC detector and two layers, that is, two transmission antennas and two reception antennas.

TABLE 1

| Modulation scheme | Coding rate | Noise threshold (dB) 1st layer | Noise threshold (dB) 2nd layer |
|---|---|---|---|
| 4QAM | 1/4 (1/5) | −2.67 (−4.04) | −3.45 (−4.67) |
| | 1/3 | −0.72 | −1.81 |
| | 2/5 | 0.68 | −0.61 |
| | 1/2 (4/9) | 2.63 (1.57) | 1.00 (0.13) |
| | 3/5 | 4.59 | 2.52 |
| | 2/3 | 5.96 | 3.56 |
| | 3/4 (11/15) | 7.83 (7.45) | 4.97 (4.68) |
| | 4/5 (7/9) | 9.17 (8.56) | 5.93 (5.50) |
| | 5/6 (37/45) | 10.18 (9.82) | 6.65 (6.40) |
| | 8/9 | 12.30 | 8.09 |
| | 9/10 | 12.81 | 8.46 |
| 16QAM | 1/4 (1/5) | 2.71 (1.09) | 1.11 (−0.23) |
| | 1/3 | 5.04 | 3.01 |
| | 2/5 | 6.71 | 4.34 |
| | 1/2 (4/9) | 8.99 (7.73) | 6.21 (5.19) |
| | 3/5 | 11.20 | 7.99 |
| | 2/3 | 12.70 | 9.18 |
| | 3/4 (11/15) | 14.69 (14.28) | 10.77 (10.43) |
| | 4/5 (7/9) | 16.10 (15.45) | 11.82 (11.35) |
| | 5/6 (37/45) | 17.16 (16.79) | 12.61 (12.34) |
| | 8/9 | 19.35 | 14.16 |
| | 9/10 | 19.88 | 14.54 |

TABLE 1-continued

| Modulation scheme | Coding rate | Noise threshold (dB) 1st layer | Noise threshold (dB) 2nd layer |
|---|---|---|---|
| 64QAM | 1/4 (1/5) | 6.60 (4.67) | 4.31 (2.74) |
| | 1/3 | 9.33 | 6.58 |
| | 2/5 | 11.27 | 8.20 |
| | 1/2 (4/9) | 13.84 (12.43) | 10.40 (9.19) |
| | 3/5 | 16.25 | 12.52 |
| | 2/3 | 17.87 | 13.90 |
| | 3/4 (11/15) | 20.02 (19.58) | 15.75 (15.39) |
| | 4/5 (7/9) | 21.51 (20.84) | 16.92 (16.39) |
| | 5/6 (37/45) | 22.62 (22.22) | 17.79 (17.50) |
| | 8/9 | 24.83 | 19.50 |
| | 9/10 | 25.39 | 19.88 |
| 256QAM | 1/4 (1/5) | 9.69 (7.45) | 6.84 (5.03) |
| | 1/3 | 12.83 | 9.57 |
| | 2/5 | 15.01 | 11.53 |
| | 1/2 (4/9) | 17.98 (16.36) | 14.23 (12.76) |
| | 3/5 | 20.75 | 16.76 |
| | 2/3 | 22.57 | 18.42 |
| | 3/4 (11/15) | 24.95 (24.44) | 20.54 (20.12) |
| | 4/5 (7/9) | 26.48 (25.77) | 21.87 (21.26) |
| | 5/6 (37/45) | 27.65 (27.25) | 22.87 (22.53) |
| | 8/9 | 29.98 | 24.70 |
| | 9/10 | 30.56 | 25.13 |

It is noted from Table 1 that a coding rate, modulation scheme, or a combination of both that can achieve a low SNR offers a high data rate. For example, a data rate that can be achieved with a combination of 16QAM and a coding rate 1/5 is higher than a data rate that can be achieved with a combination of 4QAM and a coding rate 4/9.

Table 2 below illustrates examples of noise thresholds for each layer, calculated for every coding rate with different modulation schemes, on the condition of four layers, that is, four transmission antennas and four reception antennas.

TABLE 2

| Modulation scheme | Coding rate | Noise threshold (dB) 1st layer | Noise threshold (dB) 2nd layer | Noise threshold (dB) 3rd layer | Noise threshold (dB) 4th layer |
|---|---|---|---|---|---|
| 4QAM | 1/4 (1/5) | −2.50 (−3.88) | −2.93 (−4.24) | −3.28 (−4.6) | −3.60 (−4.8) |
| | 1/3 | −0.48 | −1.05 | −1.58 | −2.00 |
| | 2/5 | 0.95 | 0.24 | −0.41 | −0.89 |
| | 1/2 (4/9) | 3.02 (1.87) | 2.01 (1.09) | 1.25 (0.36) | 0.56 (−0.23) |
| | 3/5 | 4.96 | 3.72 | 2.75 | 2.03 |
| | 2/3 | 6.38 | 4.90 | 3.76 | 2.93 |
| | 3/4 (11/15) | 8.31 (7.89) | 6.42 (6.10) | 5.17 (4.88) | 4.17 (3.91) |
| | 4/5 (7/9) | 9.60 (9.04) | 7.44 (6.96) | 6.04 (5.65) | 4.97 (4.61) |
| | 5/6 (37/45) | 10.65 (10.24) | 8.20 (7.93) | 6.71 (6.49) | 5.59 (5.38) |
| | 8/9 | 12.75 | 9.80 | 8.01 | 6.73 |
| | 9/10 | 13.26 | 10.18 | 8.33 | 6.98 |
| 16QAM | 1/4 (1/5) | 3.27 (1.57) | 2.35 (0.75) | 1.50 (0.09) | 0.85 (−0.42) |
| | 1/3 | 5.87 | 4.52 | 3.51 | 2.63 |
| | 2/5 | 7.69 | 6.09 | 4.88 | 3.99 |
| | 1/2 (4/9) | 10.26 (8.84) | 8.18 (6.99) | 6.80 (5.75) | 5.75 (4.8) |
| | 3/5 | 12.73 | 10.17 | 8.59 | 7.45 |
| | 2/3 | 14.32 | 11.49 | 9.77 | 8.53 |
| | 3/4 (11/15) | 16.53 (16.06) | 13.20 (12.84) | 11.34 (11.1) | 9.99 (9.69) |
| | 4/5 (7/9) | 17.99 (17.34) | 14.32 (13.82) | 12.35 (11.9) | 10.89 (10.5) |
| | 5/6 (37/45) | 19.14 (18.75) | 15.10 (14.83) | 13.03 (12.8) | 11.61 (11.4) |
| | 8/9 | 21.39 | 16.76 | 14.48 | 12.93 |
| | 9/10 | 21.92 | 17.14 | 14.81 | 13.26 |
| 64QAM | 1/4 (1/5) | 7.65 (5.48) | 6.05 (4.18) | 4.92 (3.30) | 4.05 (2.44) |
| | 1/3 | 10.79 | 8.65 | 7.25 | 6.22 |
| | 2/5 | 12.96 | 10.46 | 8.89 | 7.77 |
| | 1/2 (4/9) | 15.82 (14.25) | 12.88 (11.57) | 11.14 (9.95) | 9.89 (8.77) |
| | 3/5 | 18.49 | 15.14 | 13.30 | 11.96 |
| | 2/3 | 20.31 | 16.63 | 14.68 | 13.28 |
| | 3/4 (11/15) | 22.58 (22.11) | 18.53 (18.13) | 16.45 (16.07) | 15.07 (14.70) |
| | 4/5 (7/9) | 24.01 (23.38) | 19.79 (19.22) | 17.61 (17.07) | 16.15 (15.66) |
| | 5/6 (37/45) | 25.18 (24.80) | 20.68 (20.38) | 18.44 (18.15) | 16.93 (16.67) |
| | 8/9 | 27.52 | 22.38 | 19.95 | 18.42 |
| | 9/10 | 28.05 | 22.80 | 20.32 | 18.73 |

TABLE 2-continued

| Modulation scheme | Coding rate | Noise threshold (dB) | | | |
|---|---|---|---|---|---|
| | | 1st layer | 2nd layer | 3rd layer | 4th layer |
| 256QAM | 1/4 (1/5) | 11.11 (8.60) | 8.98 (6.87) | 7.48 (5.58) | 6.47 (4.69) |
| | 1/3 | 14.80 | 11.97 | 10.33 | 9.07 |
| | 2/5 | 17.26 | 14.20 | 12.35 | 11.07 |
| | 1/2 (4/9) | 20.53 (18.76) | 17.01 (15.42) | 15.07 (13.61) | 13.69 (12.32) |
| | 3/5 | 23.38 | 19.62 | 17.59 | 16.22 |
| | 2/3 | 25.32 | 21.35 | 19.24 | 17.85 |
| | 3/4 (11/15) | 27.75 (27.22) | 23.51 (23.05) | 21.33 (20.92) | 19.88 (19.46) |
| | 4/5 (7/9) | 29.31 (28.58) | 24.82 (24.25) | 22.62 (22.00) | 21.14 (20.57) |
| | 5/6 (37/45) | 30.54 (30.16) | 25.81 (25.47) | 23.55 (23.24) | 22.05 (21.75) |
| | 8/9 | 32.85 | 27.69 | 25.28 | 23.71 |
| | 9/10 | 33.44 | 28.12 | 25.67 | 24.08 |

In Table 1 and Table 2, LDPC coding is used as a coding scheme. If an LDPC code of length 16200 bits is used, an actual coding rate is different from an indicated coding rate in some cases. In this context, actual coding rates and noise thresholds calculated based on the actual coding rates are indicated in brackets in Table 1 and Table 2.

If SVC is used in Table 1 and Table 2, a $1^{st}$ layer may be a base layer and at least one of the other layers, $2^{nd}$, $3^{rd}$, or $4^{th}$ layers may be an enhanced layer. However, if SVC is not used, there is no need for distinguishing a base layer from enhanced layers.

After calculating noise thresholds for every data rate supported by each of the base layer and the at least one enhanced layer, the transmitter tabulates the noise thresholds, and stores and manages the noise threshold table. The noise threshold calculation operation in step 210 does not always need to be performed for implementation of the present invention. That is, step 210 may be omitted if the transmitter is aware of noise thresholds for every data rate for each layer through a pre-configured table.

In step 212, the transmitter selects a reference noise threshold. For this purpose, the transmitter allocates a data rate to the base layer among a plurality of layers, based on a current channel environment and selects, as a reference noise threshold, a noise threshold that is predicted when base-layer data is transmitted at the allocated data rate. The transmitter is aware of the predicted noise threshold for the data rate allocated to the base layer through the afore-described noise threshold calculation operation or the pre-configured table.

The transmitter determines whether or not to use SVC in step 214. The use or non-use of SVC may be selected by a user or determined according to content to be serviced or channel characteristics.

If SVC is not used, the transmitter selects a target noise threshold for the at least one enhanced layer according to a first condition in step 216. The first condition may be set such that the receiver succeeds in decoding enhanced-layer data. For example, the first condition may be that a lower noise threshold than the reference noise threshold is selected from among noise thresholds achievable for the enhanced layer. For example, a highest of noise thresholds, which are lower than the reference noise threshold, is selected as a target noise threshold for the enhanced layer from among the noise thresholds that the enhanced layer can achieve.

In step 218, the transmitter determines a data rate corresponding to the selected target noise threshold. For determining the data rate, both a modulation scheme and a coding rate may be considered, only a coding rate may be considered for a given modulation scheme, or a modulation scheme may be considered for a given coding rate.

Referring to Table 1, for example, if the $1^{st}$ layer uses 16QAM and a coding rate 1/2, the reference noise threshold is 8.99 dB. Thus, the highest 8.46 dB of lower noise thresholds than the reference noise threshold 8.99 dB is selected as the target noise threshold for the $2^{nd}$ layer. Thereafter, a modulation scheme 4QAM and a coding rate 9/10 corresponding to the target noise threshold 8.46 dB are determined for the $2^{nd}$ layer.

However, if 16QAM is preset for all layers, the highest 7.99 dB of noise thresholds lower than the reference noise threshold 8.99 dB is selected as the target noise threshold for the $2^{nd}$ layer. Thereafter, a coding rate 3/5 corresponding to the selected target noise threshold 7.99 dB is determined for the $2^{nd}$ layer.

As another example, referring to Table 2, if the $1^{st}$ layer uses 16QAM and a coding rate 1/2, the reference noise threshold is 10.26 dB. Thus, the highest noise thresholds 10.17 dB, 9.77 dB, and 9.99 dB of lower noise thresholds than the reference noise threshold 10.26 dB are selected as target noise thresholds for the $2^{nd}$, $3^{rd}$, and $4^{th}$ layers. Thereafter, 16QAM and 3/5, 16QAM and 2/3, and 16QAM and 3/4 corresponding to the respective target noise thresholds 10.17 dB, 9.77 dB, and 9.99 dB are determined as modulation schemes and coding rates for the $2^{nd}$, $3^{rd}$, and $4^{th}$ layers.

However, even though 16QAM is preset for all layers, when the $1^{st}$ layer uses the coding rate 1/2, the same coding rates, as described above, may be allocated to the other layers.

However, when SVC is used in step 214, the transmitter selects a target noise threshold for the at least one enhanced layer according to a second condition in step 220. The second condition is set with respect to the reference noise threshold such that decoding of enhanced-layer data may not be successful. For example, the second condition may be that a higher noise threshold than the reference noise threshold is selected from among noise thresholds achievable for the enhanced layer. For example, a lowest of noise thresholds, which are higher than the reference noise threshold, is selected as a target noise threshold for the enhanced layer from among the noise thresholds that the enhanced layer can achieve.

In step 222, the transmitter determines a data rate corresponding to the selected target noise threshold. For determining the data rate, both a modulation scheme and a coding rate may be considered, only a coding rate may be considered for a given modulation scheme, or a modulation scheme may be considered for a given coding rate.

Referring to Table 1, for example, if the base layer uses 16QAM and the coding rate 1/2, the reference noise threshold is 8.99 dB. Thus, the lowest 9.18 dB of higher noise thresholds than the reference noise threshold 8.99 dB is selected for the $2^{nd}$ layer. Thereafter, a modulation scheme 4QAM and a coding rate 2/3 corresponding to the target noise threshold 9.18 dB are determined for the enhanced layer.

However, even though 16QAM is preset for all layers, when the base layer uses the coding rate 1/2, the same coding rate 2/3 may be determined for the enhanced layer.

As another example, referring to Table 2, if the base layer uses 16QAM and the coding rate 1/2, the reference noise threshold is 10.26 dB. Thus, the lowest noise thresholds 10.46 dB, 10.33 dB, and 10.89 dB of higher noise thresholds than the reference noise threshold 10.26 dB are selected as target noise thresholds for the $2^{nd}$, $3^{rd}$, and $4^{th}$ layers. in step 222, 64QAM and 2/5, 256QAM and 1/3, and 16QAM and 4/5 corresponding to the respective target noise thresholds 10.46 dB, 10.33 dB, and 10.89 dB are determined as modulation schemes and coding rates for the $2^{nd}$, $3^{rd}$ and $4^{th}$ layers.

However, if 16QAM is preset for all layers, 11.49 dB, 11.34 dB, and 10.89 dB are selected as the target noise thresholds of the three enhanced layers, the $2^{nd}$, $3^{rd}$, and $4^{th}$ layers. In addition, coding rates 2/3, 3/4, and 4/5 corresponding to the selected target noise thresholds 11.49 dB, 11.34 dB, and 10.89 dB are determined for the $2^{nd}$, $3^{rd}$, and $4^{th}$ layers.

After the data rates are determined for the base layer and the at least one enhanced layer (or the $2^{nd}$ layer) in the above operation, the transmitter transmits data at the determined data rates in step 224. Specifically, the transmitter transmits the base-layer data (or $1^{st}$ layer data) at the base-layer data rate determined for the base layer (or the $1^{st}$ layer) and transmits the enhanced-layer data (or $2^{nd}$ layer data) at the enhanced-layer data rate determined for the enhanced layer (or the $2^{nd}$ layer).

In the above-described examples, when SVC is not used, the transmitter transmits the $1^{st}$ layer data at a coding rate 2/3 in 16QAM and the $2^{nd}$ layer data at a coding rate 3/5 in 64QAM. However, when SVC is used, the transmitter transmits the base-layer data at a coding rate 2/3 in 16QAM and the enhanced-layer data at a coding rate 4/9 in 128QAM.

In accordance with an embodiment of the present invention, target noise thresholds are selected for the other layers, using a reference noise threshold for a base layer, and modulation schemes and/or coding rates are allocated to the other layers according to the selected target noise thresholds.

It may be further contemplated as another embodiment that a modulation scheme and/or a coding rate is directly allocated to at least one enhanced layer (or $2^{nd}$ layer) according to a modulation scheme and a coding rate used for a base layer (or $1^{st}$ layer).

For this purpose, mapping tables for respective layers should be pre-configured for both using SVC and not using SVC. The mapping tables map modulation scheme and coding rate combinations for the base layer (or the $1^{st}$ layer) to modulation scheme and coding rate combinations for the enhanced layer (or the $2^{nd}$ layer), based on the calculation results listed in Table 1 and Table 2. Preferably, the mapping tables should be defined separately for using SVC and not using SVC.

Table 3 tabulates modulation scheme and coding rate combinations available to the enhanced layer (or the $2^{nd}$ layer) corresponding to modulation scheme and coding rate combinations available to the base layer (or the $1^{st}$ layer), when actual coding rates and SVC are used.

TABLE 3

| Base layer | | Enhanced layer | |
|---|---|---|---|
| Modulation scheme | Coding rate | Modulation scheme | Coding rate |
| 4QAM | 1/5 | 4QAM | 1/3 |
|  | 1/3 |  | 2/5 |
|  | 2/5 |  | 3/5 |
|  | 4/9 |  | 3/5 |
|  | 3/5 |  | 11/15 |
|  | 2/3 |  | 37/45 |
|  | 11/15 | 16QAM | 3/5 |
|  | 7/9 |  | 2/3 |
|  | 37/45 |  | 11/15 |
|  | 8/9 |  | 37/45 |
| 16QAM | 1/5 | 4QAM | 3/5 |
|  | 1/3 |  | 37/45 |
|  | 2/5 | 16QAM | 3/5 |
|  | 4/9 |  | 3/5 |
|  | 3/5 |  | 7/9 |
|  | 2/3 | 64QAM | 2/3 |
|  | 11/15 |  | 11/15 |
|  | 7/9 |  | 11/15 |
|  | 37/45 |  | 7/9 |
|  | 8/9 |  | 8/9 |
| 64QAM | 1/5 | 256QAM | 1/5 |
|  | 1/3 |  | 1/3 |
|  | 2/5 | 16QAM | 7/9 |
|  | 4/9 | 64QAM | 2/3 |
|  | 3/5 |  | 7/9 |
|  | 2/3 |  | 8/9 |
|  | 11/15 | 256QAM | 11/15 |
|  | 7/9 |  | 7/9 |
|  | 37/45 |  | 37/45 |
|  | 8/9 |  | 8/9 |
| 256QAM | 1/5 | 16QAM | 3/5 |
|  | 1/3 | 64QAM | 2/3 |
|  | 2/5 |  | 11/15 |
|  | 4/9 |  | 7/9 |
|  | 3/5 | 256QAM | 7/9 |
|  | 2/3 |  | 8/9 |
|  | 11/15 |  | 8/9 |
|  | 7/9 |  | 8/9 |
|  | 37/45 |  | 8/9 |
|  | 8/9 |  | 8/9 |

Table 4 tabulates modulation scheme and coding rate combinations available to the enhanced layer (or the $2^{nd}$ layer) corresponding to modulation scheme and coding rate combinations available to the base layer (or the $1^{st}$ layer), when actual coding rates are used and SVC is not used.

TABLE 4

| 1st Layer | | 2nd Layer | |
|---|---|---|---|
| Modulation scheme | Coding rate | Modulation scheme | Coding rate |
| 4QAM | 1/5 | 4QAM | 1/5 |
|  | 1/3 |  | 1/3 |
|  | 2/5 |  | 4/9 |
|  | 4/9 |  | 4/9 |
|  | 3/5 | 16QAM | 2/5 |
|  | 2/3 |  | 4/9 |
|  | 11/15 | 64QAM | 1/3 |
|  | 7/9 |  | 2/5 |
|  | 37/45 | 128QAM | 1/3 |
|  | 8/9 |  | 2/5 |
| 16QAM | 1/5 | 4QAM | 4/9 |
|  | 1/3 | 16QAM | 1/5 |
|  | 2/5 | 64QAM | 1/3 |
|  | 4/9 |  | 1/3 |
|  | 3/5 | 16QAM | 11/15 |
|  | 2/3 | 64QAM | 3/5 |
|  | 11/15 |  | 2/3 |
|  | 7/9 |  | 11/15 |

TABLE 4-continued

| 1st Layer | | 2nd Layer | |
|---|---|---|---|
| Modulation scheme | Coding rate | Modulation scheme | Coding rate |
| | 37/45 | 128QAM | 3/5 |
| | 8/9 | | 2/3 |
| 64QAM | 1/5 | 16QAM | 2/5 |
| | 1/3 | 64QAM | 4/9 |
| | 2/5 | 16QAM | 11/15 |
| | 4/9 | | 37/45 |
| | 3/5 | 64QAM | 11/15 |
| | 2/3 | | 37/45 |
| | 11/15 | | 8/9 |
| | 7/9 | 128QAM | 11/15 |
| | 37/45 | | 7/9 |
| | 8/9 | | 8/9 |
| 256QAM | 1/5 | 64QAM | 1/3 |
| | 1/3 | | 3/5 |
| | 2/5 | | 2/3 |
| | 4/9 | | 11/15 |
| | 3/5 | 128QAM | 11/15 |
| | 2/3 | | 37/45 |
| | 11/15 | | 37/45 |
| | 7/9 | | 8/9 |
| | 37/45 | | 8/9 |
| | 8/9 | | 8/9 |

When using SVC, for example, if 16QAM and a coding rate 3/5 are used for the base layer, 16QAM and a coding rate 7/9 are allocated to the enhanced layer, referring to Table 3. When SVC is not used, if 16QAM and the coding rate 3/5 are used for the base layer, 16QAM and a coding rate 11/15 are allocated to the enhanced layer, referring to Table 4.

Although the description above illustrates mapping tables for two transmission antennas and two reception antennas, it is also possible to define mapping tables for four transmission antennas and four reception antennas based on Table 2, and thus, to allocate modulation schemes and/or coding rates to three enhanced layers or three $2^{nd}$ layers using the mapping tables.

Likewise, mapping tables may be configured when a modulation scheme or a coding rate is preset for all layers. Thus, a coding rate or a modulation scheme may be allocated to at least one enhanced layer ($2^{nd}$ layer) using the mapping tables.

As is apparent from the description above, when SVC is not used in a multi-antenna system, enhanced-layer data is configured so that a receiver can receive the enhanced-layer data successfully. If SVC is used, the performance difference between a base layer and an enhanced layer is minimized even in a poor channel environment. Therefore, the performance of the multi-antenna system is increased.

While the present invention has been particularly shown and described with reference to various embodiments thereof, it will be understood by those of ordinary skill in the art that various changes in form and details may be made therein without departing from the spirit and scope of the present invention as defined by the following claims and their equivalents.

What is claimed is:

1. A method for allocating a data rate at a transmitter including a plurality of antennas, comprising:
    determining a reference noise threshold corresponding to a data transmission at a first data rate applied to a base layer from among a plurality of layers;
    determining a first modulation scheme and a first coding rate for the first data rate;
    determining a target noise threshold corresponding to one or more other layers from among the plurality of layers based on the reference noise threshold and whether scalable video coding (SVC) is used;
    allocating a second data rate corresponding to the one or more other layers, based on the determined target noise threshold; and
    determining a second modulation scheme and a second coding rate for the second data rate,
    wherein when the SVC is used, the reference noise threshold is determined such that base-layer data can be received at a receiver in a low-signal to noise ratio (SNR) channel environment, and
    wherein when the SVC is not used, the target noise threshold is determined such that enhanced-layer data and the base-layer data can be received at the receiver in the low-SNR channel environment.

2. The method of claim 1, wherein determining the target noise threshold comprises:
    selecting, as the target noise threshold for the one or more other layers, one of noise thresholds that are higher than the reference noise threshold from among noise thresholds corresponding to the one or more other layers, if the SVC for the data transmission is used; and
    selecting, as the target noise threshold for the one or more other layers, one of noise thresholds that are lower than the reference noise threshold from among the noise thresholds corresponding to the one or more other layers, if the SVC for the data transmission is not used.

3. The method of claim 2, wherein if the SVC for the data transmission is used, the target noise threshold is a lowest of the noise thresholds that are higher than the reference noise threshold, and if the SVC for the data transmission is not used, the target noise threshold is a highest of the noise thresholds that are lower than the reference noise threshold.

4. The method of claim 3, wherein each of the reference noise threshold and the target noise threshold is a minimum signal-to-noise ratio (SNR) at which data transmitted at a predetermined data rate corresponding to the noise threshold is decodable without errors.

5. The method of claim 1, wherein the first and second modulation schemes and the first and second coding rates are managed in a memory table.

6. An apparatus for allocating a data rate at a transmitter including a plurality of antennas, the apparatus comprising:
    a data rate allocator configured to determine a reference noise threshold corresponding to data transmission at a first data rate applied to a base layer from among a plurality of layers, determine a first modulation scheme and a first coding rate for the first data rate, determine a target noise threshold corresponding to one or more other layers from among the plurality of layers based on the reference noise threshold and whether scalable video coding (SVC) is used, allocate a second data rate corresponding to the one or more other layers, based on the determined target noise threshold, and determine a second modulation scheme and a second coding rate for the second data rate; and
    a transmission module configured to transmit data for the base layer based on the first modulation scheme and the first coding rate and transmit data for the one or more other layers based on the second modulation scheme and the second coding rate,
    wherein when the SVC is used, the reference noise threshold is determined such that the data for the base layer can be received at a receiver in a low-signal to noise ratio (SNR) channel environment, and
    wherein when the SVC is not used, the target noise threshold is determined such that the data for the base layer and the data for the one or more other layers can be received at the receiver in the low-SNR channel environment.

7. The apparatus of claim 6, wherein if SVC for the data transmission is used, the data rate allocator selects, as the target noise threshold for the one or more other layers, one of noise thresholds that are higher than the reference noise threshold from among noise thresholds corresponding to the one or more other layers, and wherein if the SVC for the data transmission is not used, the data rate allocator selects, as the target noise threshold for the one or more other layers, one of noise thresholds that are lower than the reference noise threshold from among the noise thresholds corresponding to the one or more other layers.

8. The apparatus of claim 7, wherein if the SVC for the data transmission is used, the target noise threshold is a lowest of the noise thresholds that are higher than the reference noise threshold, and if the SVC for the data transmission is not used, the target noise threshold is a highest of the noise thresholds that are lower than the reference noise threshold.

9. The apparatus of claim 8, wherein each of the reference noise threshold and the target noise threshold is a minimum signal-to-noise ratio (SNR) at which data transmitted at a predetermined data rate corresponding to the noise threshold is decodable without errors.

10. The apparatus of claim 6, wherein the apparatus further comprises a recording medium configured to manage the first and second modulation schemes and the first and second coding rates.

11. A non-transitory computer-readable medium for use in allocating a data rate at a transmitter including a plurality of antennas, the non-transitory computer-readable medium recording a program allowing a computer to execute a method comprising:

setting, as a reference noise threshold a noise threshold corresponding to data transmission at a first data rate applied to a base layer from among a plurality of layers;

determining a first modulation scheme and a first coding rate for the first data rate;

determining a target noise threshold corresponding to one or more other layers from among the plurality of layers based on the reference noise threshold and whether scalable video coding (SVC) is used;

allocating a second data rate to corresponding to the one or more other layers, based on the determined target noise threshold; and determining a second modulation scheme and a second coding rate for the second data rate, wherein when the SVC is used, the reference noise threshold is determined such that base-layer data can be received at a receiver in a low-signal to noise ratio (SNR) channel environment, and wherein when the SVC is not used, the target noise threshold is determined such that enhanced-layer data and base-layer data can be received at the receiver in the low-SNR channel environment.

12. The computer-readable recording medium of claim 11, wherein determining the target noise threshold comprises:

selecting, as the target noise threshold for the one or more other layers, one of noise thresholds that are higher than the reference noise threshold from among noise thresholds corresponding to the one or more other layers, if the SVC for the data transmission is used; and selecting, as the target noise threshold for the one or more other layers, one of noise thresholds that are lower than the reference noise threshold from among the noise thresholds corresponding to the one or more other layers, if the SVC for the data transmission is not used.

13. The computer-readable recording medium of claim 12, wherein if the SVC for the data transmission is used, the target noise threshold is a lowest of the noise thresholds that are higher than the reference noise threshold, and if the SVC for the data transmission is not used, the target noise threshold is a highest of the noise thresholds that are lower than the reference noise threshold.

14. The computer-readable recording medium of claim 13, wherein each of the reference noise threshold and the target noise threshold is a minimum signal-to-noise ratio (SNR) at which data transmitted at a predetermined data rate corresponding to the noise threshold is decodable without errors.

15. A transmitter, comprising:

a plurality of antennas;

a base layer transmitter configured to determine a reference noise threshold corresponding to data transmission at a first data rate applied to a base layer from among a plurality of layers, determine a first modulation scheme and a first coding rate for the first data rate, and transmit data for the base layer based on the first modulation scheme and the first coding rate through one of the plurality of antennas;

a data rate allocator configured to allocate a second data rate corresponding to one or more other layers, based on the determined target noise threshold, and determine a second modulation scheme and a second coding rate for the second data rate; and an other layer transmitter configured to determine a target noise threshold corresponding to the one or more other layers from among the plurality of layers based on the reference noise threshold and whether scalable video coding (SVC) is used, determine a second modulation scheme and a second coding rate for the second data rate, and transmit data for the one or more other layers based on the second modulation scheme and the second coding rate through at least one of another one of the plurality of antennas, wherein when the SVC is used, the reference noise threshold is determined such that the data for the base layer can be received at a receiver in a low-signal to noise ratio (SNR) channel environment, and wherein when the SVC is not used, the target noise threshold is determined such that the data for the base layer and the data for the one or more other layers can be received at the receiver in the low-SNR channel environment.

16. The transmitter of claim 15, wherein if SVC for the data transmission is used, the data rate allocator selects, as the target noise threshold for the one or more other layers, one of noise thresholds that are higher than the reference noise threshold from among noise thresholds corresponding to the one or more other layers, and wherein if the SVC for the data transmission is not used, the data rate allocator selects, as the target noise threshold for the one or more other layers, one of noise thresholds that are lower than the reference noise threshold from among the noise thresholds corresponding to the one or more other layers.

17. The transmitter of claim 16, wherein if the SVC for the data transmission is used, the target noise threshold is a lowest of the noise thresholds that are higher than the reference noise threshold, and wherein if the SVC for data transmission is not used, the target noise threshold is a highest of the noise thresholds that are lower than the reference noise threshold.

18. The transmitter of claim 17, wherein each of the reference noise threshold and the target noise threshold is a minimum signal-to-noise ratio (SNR) at which data transmitted at a predetermined data rate corresponding to the noise threshold is decodable without errors.

19. The transmitter of claim 15, wherein the transmitter further comprises a recording medium configured to manage the first and second modulation schemes and the first and second modulation schemes and the first and second coding rates.

* * * * *